US012659124B2

(12) United States Patent
Qiao

(10) Patent No.: US 12,659,124 B2
(45) Date of Patent: Jun. 16, 2026

(54) RADIO-FREQUENCY RETUNING METHOD AND APPARATUS

(71) Applicant: BEIJING XIAOMI MOBILE SOFTWARE CO., LTD., Beijing (CN)

(72) Inventor: Xuemei Qiao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 365 days.

(21) Appl. No.: 18/278,398

(22) PCT Filed: Feb. 23, 2021

(86) PCT No.: PCT/CN2021/077526
§ 371 (c)(1),
(2) Date: Aug. 22, 2023

(87) PCT Pub. No.: WO2022/178690
PCT Pub. Date: Sep. 1, 2022

(65) Prior Publication Data
US 2024/0137190 A1    Apr. 25, 2024
US 2024/0235795 A9    Jul. 11, 2024

(51) Int. Cl.
*H04L 5/00*        (2006.01)
*H04W 72/0446*    (2023.01)
*H04W 72/1268*    (2023.01)
*H04W 72/232*      (2023.01)

(52) U.S. Cl.
CPC .......... *H04L 5/0094* (2013.01); *H04L 5/0012* (2013.01); *H04L 5/0051* (2013.01); *H04W*

*72/0446* (2013.01); *H04W 72/1268* (2013.01); *H04W 72/232* (2023.01)

(58) Field of Classification Search
CPC ... H04L 5/0094; H04L 5/0012; H04L 5/0051; H04W 72/232; H04W 72/0446; H04W 72/1268
See application file for complete search history.

(56) References Cited

U.S. PATENT DOCUMENTS

| | | | | |
|---|---|---|---|---|
| 11,096,175 | B2 | 8/2021 | Awad | |
| 2017/0013481 | A1* | 1/2017 | Wang | H04J 13/0044 |
| 2017/0033843 | A1* | 2/2017 | Wang | H04L 5/0012 |
| 2017/0141901 | A1* | 5/2017 | Rico Alvarino | H04L 5/0064 |

(Continued)

FOREIGN PATENT DOCUMENTS

| | | |
|---|---|---|
| CN | 107409391 A | 11/2017 |
| CN | 109151912 A | 1/2019 |

(Continued)

OTHER PUBLICATIONS

International Search Report of PCT/CN2021/077526 dated Oct. 26, 2021 with English translation, (4p).

(Continued)

*Primary Examiner* — Jael M Ulysse
(74) *Attorney, Agent, or Firm* — Arch & Lake LLP

(57) ABSTRACT
A radio-frequency retuning method and apparatus. The method comprises: determining at least one target symbol for radio-frequency retuning (RF retuning), wherein the at least one target symbol is located between a starting symbol of a first hop of msg3 and an ending symbol of a second hop thereof, and performing RF retuning processing on the target symbol.

18 Claims, 5 Drawing Sheets

S101

Determine a target symbol for radio-frequency retuning (RF retuning), wherein the target symbol is at least one symbol located between a starting symbol of a first hop of msg3 and an ending symbol of a second hop thereof

S102

Perform RF retuning on the target symbol

(56) References Cited

U.S. PATENT DOCUMENTS

| | | | |
|---|---|---|---|
| 2017/0208590 A1* | 7/2017 | Kim | H04W 72/0453 |
| 2017/0279646 A1* | 9/2017 | Yi | H04W 74/002 |
| 2017/0332370 A1* | 11/2017 | Rico Alvarino | H04L 5/001 |
| 2018/0020432 A1* | 1/2018 | Rico Alvarino | H04W 72/0453 |
| 2018/0035424 A1* | 2/2018 | Sun | H04W 72/04 |
| 2018/0109286 A1* | 4/2018 | Yao | H04W 4/70 |
| 2018/0227156 A1* | 8/2018 | Papasakellariou | H04B 7/0456 |
| 2018/0367185 A1* | 12/2018 | Yi | H04B 1/7143 |
| 2019/0109732 A1* | 4/2019 | Choi | H04L 5/0051 |
| 2019/0182823 A1* | 6/2019 | Awad | H04W 72/21 |
| 2019/0190669 A1* | 6/2019 | Park | H04W 72/21 |
| 2019/0208505 A1* | 7/2019 | Park | H04L 5/0053 |
| 2019/0246371 A1* | 8/2019 | Hwang | H04W 72/0446 |
| 2019/0364602 A1* | 11/2019 | Yi | H04W 74/0833 |
| 2020/0029392 A1* | 1/2020 | Ye | H04W 4/70 |
| 2020/0059332 A1* | 2/2020 | Takeda | H04L 5/0053 |
| 2020/0059345 A1* | 2/2020 | Pelletier | H04L 1/16 |
| 2020/0128585 A1* | 4/2020 | Kuang | H04L 5/0053 |
| 2021/0014851 A1* | 1/2021 | Liu | H04L 5/0053 |
| 2021/0029743 A1* | 1/2021 | Lei | H04B 1/713 |
| 2022/0039115 A1* | 2/2022 | Sun | H04W 72/54 |
| 2023/0031875 A1* | 2/2023 | Dai | H04L 5/0012 |
| 2023/0223985 A1* | 7/2023 | Rastegardoost | H04B 1/7143 |
| | | | 375/132 |
| 2023/0292322 A1* | 9/2023 | Kim | H04L 1/1864 |
| 2024/0048275 A1* | 2/2024 | Liu | H04L 1/08 |
| 2024/0049205 A1* | 2/2024 | Fei | H04W 72/0453 |

FOREIGN PATENT DOCUMENTS

| | | |
|---|---|---|
| CN | 109565818 A | 4/2019 |
| WO | 2018081597 A1 | 5/2018 |

OTHER PUBLICATIONS

First Office Action of CN Application No. 202180000400.0 dated Apr. 25, 2022 with English translation, (12p).

Ericsson, "UE complexity reduction for RedCap", 3GPP TSG-RAN WG1 Meeting #104-e, Tdoc R1-2100034, e-Meeting, Jan. 25, 2021, (12p).

ZTE, "Potential UE complexity reduction features", 3GPP TSG RAN WG1 #103-e, R1-2007715, e-Meeting, Oct. 26, 2020, (20p).

Oppo, "Discussion on UE complexity reduction", 3GPP TSG RAN WG1 #104-e, R1-2100165, e-Meeting, Jan. 25, 2021, (10p).

Sierra Wireless, "Methods for barring and for capability reporting", 3GPP TSG-RAN WG2 Meeting #113 electronic, R2-2100636, Online, Jan. 25, 2021, (7p).

* cited by examiner

S101
Determine a target symbol for radio-frequency retuning (RF retuning), wherein the target symbol is at least one symbol located between a starting symbol of a first hop of msg3 and an ending symbol of a second hop thereof
S102
Perform RF retuning on the target symbol
FIG. 1
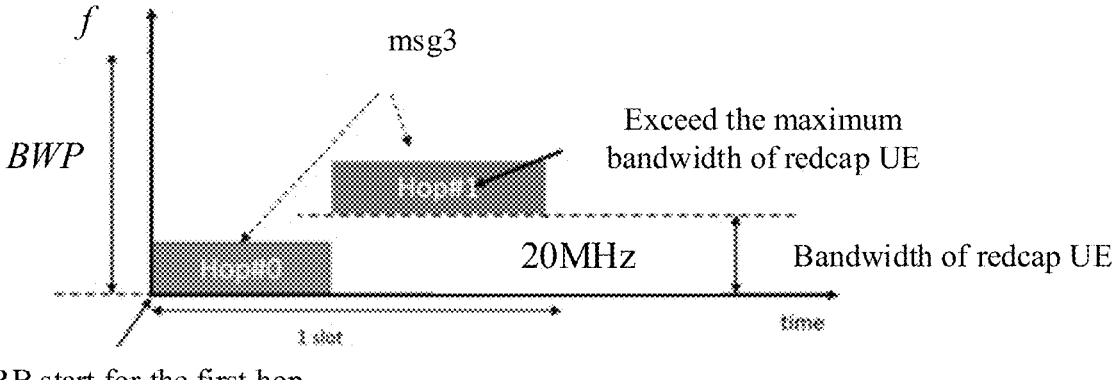
FIG. 2
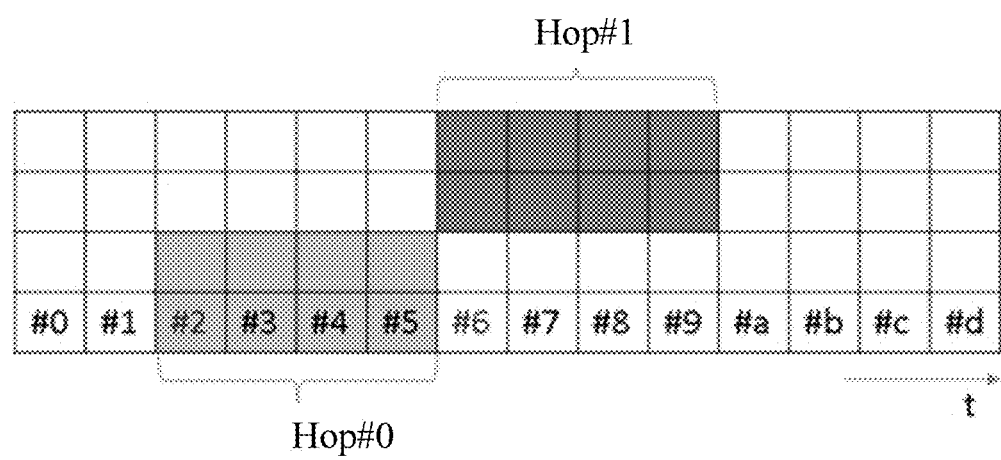
FIG. 3

S501 sending indication information to a user equipment (UE), wherein the indication information is configured to instruct the UE to determine a target symbol for RF retuning, the target symbol being at least one symbol between a start symbol of a first hop and an end symbol of a second hop for msg3

FIG. 13

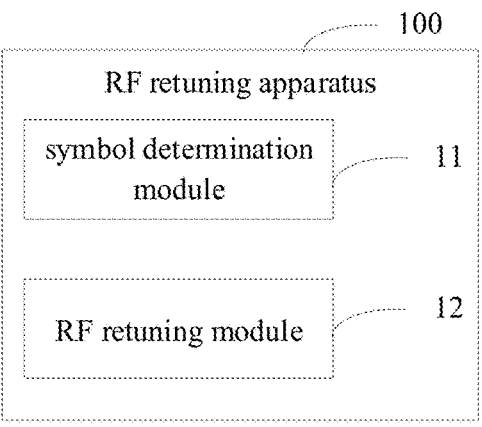

100

RF retuning apparatus symbol determination module                          11

RF retuning module                          12

FIG. 14

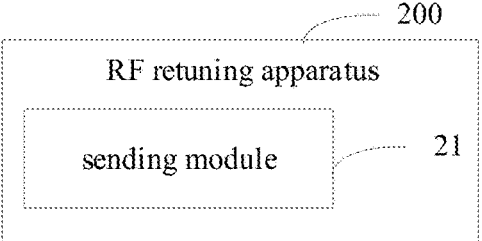

200

RF retuning apparatus sending module                          21

FIG. 15

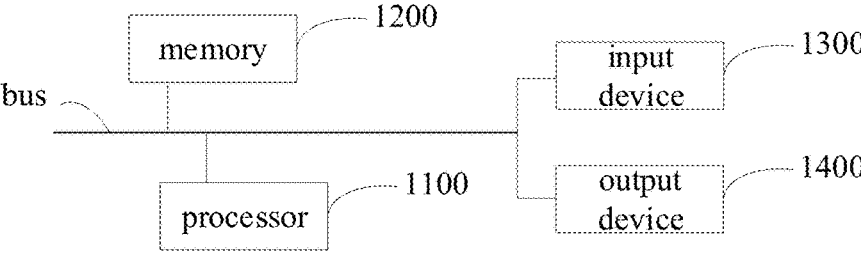

bus memory          1200 input device          1300 processor          1100 output device          1400

FIG. 16

RADIO-FREQUENCY RETUNING METHOD AND APPARATUS

CROSS-REFERENCE TO RELATED APPLICATION

The present application is the U.S. National phase application of International Application No. PCT/CN2021/077526, filed on Feb. 23, 2021, the entire content of which is incorporated herein by reference for all purposes.

BACKGROUND

In related technologies, normal User Equipment (normal UE) and Reduced capability UE (redcap UE) can share the same initial UpLink Bandwidth Part (initial UL BWP). In order to avoid the redcap UE impacting the normal UE, a larger initial UL BWP may be configured based on the capability of the normal UE, which may be larger or much larger than the system bandwidth of the redcap UE. For the transmission of message 3 (msg3) in the random access procedure, a certain hop (first or second hop) may exceed the redcap UE system bandwidth.

SUMMARY

The present disclosure relates to the field of mobile communications, and in particular, to a method and apparatus for radio frequency retuning, a communication device, and a storage medium for solving the problem that a certain hop may exceed the system bandwidth of the redcap UE in the transmission of msg3.

According to a first aspect of the present disclosure, a method for radio frequency retuning is provided, applicable to a UE, the method including: determining a target symbol for radio frequency (RF) retuning located between two hops for transmission of msg3; and preforming the RF retuning on the target symbol.

According to a second aspect of the present disclosure, a method for radio frequency retuning is provided, applicable to a network device, the method including: sending indication information to a user equipment (UE), wherein the indication information is configured to instruct the UE to determine a target symbol for RF retuning.

According to a third aspect of the present disclosure, an apparatus for radio frequency retuning is provided, the apparatus including: a symbol determination module configured to determine a target symbol for RF retuning located between two hops for transmission of msg3; and a RF retuning module configured to perform the RF retuning on the target symbol.

According to a fourth aspect of the present disclosure, an apparatus for radio frequency retuning is provided, the apparatus including: a sending module configured to send indication information to a UE, wherein the indication information is configured to instruct the UE to determine a target symbol for RF retuning.

According to a fifth aspect of the present disclosure, a communication device is provided, including: at least one processor, and a memory in a communication connection with the at least one processor. The memory stores instructions executable by the at least one processor, the instructions being executable by the at least one processor to enable the at least one processor to perform the method for radio frequency retuning described in the first aspect of the present disclosure, or the method for radio frequency retuning described in the second aspect of the present disclosure.

According to the embodiments of a sixth aspect of the present disclosure, there is proposed a non-transitory computer storage medium. The computer storage medium stores computer-executable instructions which, when executed by a processor, enable the processor to implement the method for radio frequency retuning described in the first aspect of the present disclosure, or the method for radio frequency retuning described in the second aspect of the present disclosure.

BRIEF DESCRIPTION OF THE DRAWINGS

The foregoing and/or additional aspects and advantages of the present disclosure will become apparent and easy to understand from the following description of embodiments in conjunction with the accompanying drawings.

FIG. 1 is a flow diagram of a radio frequency retuning method provided by an embodiment of the present disclosure.

FIG. 2 is a schematic diagram of frequency hopping occurring in msg3 provided by an embodiment of the present disclosure.

FIG. 3 is a schematic diagram of two hops in msg3 provided by an embodiment of the present disclosure.

FIG. 13 is a flow diagram of yet another radio frequency retuning method provided by an embodiment of the present disclosure.

FIG. 14 is a schematic diagram of a structure of a radio frequency retuning apparatus provided by an embodiment of the present disclosure.

FIG. 15 is a schematic diagram of a structure of another radio frequency retuning apparatus provided by an embodiment of the present disclosure.

FIG. 16 is a schematic diagram of a communication device provided by an embodiment of the present disclosure.

DETAILED DESCRIPTION

Figure 4:
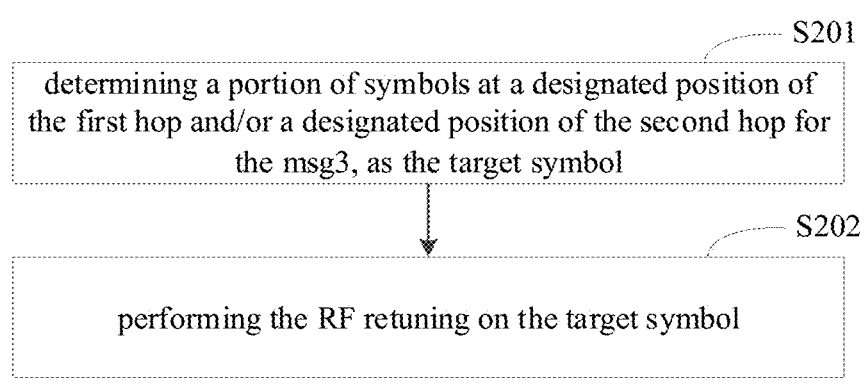
FIG. 4 is a flow diagram of another radio frequency retuning method provided by an embodiment of the present disclosure.

Embodiments of the present disclosure are described in detail below, and examples of these embodiments are shown in the accompanying drawings, wherein the same or similar labels throughout denote the same or similar elements, or elements having the same or similar functions. The embodiments described below with reference to the accompanying drawings are exemplary and are intended to be used to explain the present disclosure and are not to be construed as a limitation of the present disclosure.

Terms in this disclosure are used solely for the purpose of describing particular embodiments and are not intended to limit this disclosure. The singular forms of "a/an" and "this" used in this disclosure and the appended claims are also intended to cover the plural forms, unless the context clearly indicates otherwise. It should also be understood that the term "and/or" as used herein refers to and includes any or all possible combinations of one or more of the associated listed items.

It should be understood that although the terms "first", "second", "third", etc. may be employed in embodiments of this disclosure to describe various types of information, such information should not be limited by these terms. These terms are only used to distinguish the same type of information from one another. For example, without departing from the scope of embodiments of this disclosure, first information may also be referred to as second information, and similarly, second information may be referred to as first information. Depending on the context, as used herein, the phrase "if" can be interpreted as "at the time of . . . " or "when . . . " or "in response to determining . . . ."

FIG. 1 is a flow diagram of a radio frequency retuning method provided by an embodiment of the present disclosure. This radio frequency (RF) retuning method is performed by a UE, which may be a redcap UE. As shown in FIG. 1, the RF retuning method includes the following steps.

S101, determining a target symbol for RF retuning, wherein the target symbol is at least one symbol between a start symbol of a first hop and an end symbol of a second hop for msg3.

S102, performing the RF retuning on the target symbol.

During the random access procedure, the UE may send msg3 to the network device, and the transmission of msg3 supports frequency hopping within the time slot, i.e., the UE sends msg3 to the network device via a first hop and a second hop. Optionally, the UE may send msg3 to the network device via the first hop and the second hop, respectively, within the same time slot. Optionally, the UE may send part of information of msg3 to the network device via the first hop within a time slot, and another part of information of msg3 to the network device via the second hop within a next time slot. It is to be understood that msg3 carries information such as a unique identification of the UE, a radio resource control (RRC) connection request, and the like.

The system bandwidth of redcap UE is only 20 MHz, while the Initial UL BWP ranges from 20 MHz to 40 MHz. When frequency hopping is enabled or activated for msg3 transmission, the first hop and the second hop used to send the msg3 have different time/frequency resources, which means that the frequency of the second hop may exceed the system bandwidth of redcap UE. As shown in FIG. 2, the first hop Hop #0 ranges from 0 to 20 MHz, while the second hop Hop #1 ranges from 20 MHz to 40 MHz.

The number of first symbols of Orthogonal Frequency Division Multiplexing (OFDM) symbols occupied by the first hop Hop #0 is $$\lfloor N_{symb}^{PUSCH,s} / 2 \rfloor.$$

$$N_{symb}^{PUSCH,s}$$

indicates the number of allocated symbols for msg3 on the Physical Uplink Shared Channel (PUSCH). In other words, a rounding operation is performed on a quotient of the number of allocated symbols $$N_{symb}^{PUSCH,s}$$

corresponding to msg3 and a designated value, and a result of the rounding operation is used as the number of first symbols. In practice, the designated value is 2, and the rounding operation performed on the quotient of the number of allocated symbols corresponding to msg3 and the designated value is a downward rounding operation. The number of second symbols of OFDM symbols occupied by the second hop Hop #1 is $$N_{symb}^{PUSCH,s} - \lfloor N_{symb}^{PUSCH,s} / 2 \rfloor.$$

As shown in FIG. 3, the number of allocated symbols corresponding to msg3 is 8. It can be determined that Hop #0 occupies 4 symbols and Hop #1 occupies 4 symbols by the above rounding operation.

It should be noted that the number of first symbols $$\lfloor N_{symb}^{PUSCH,s} / 2 \rfloor$$

for the first hop, the number of second symbols $$N_{symb}^{PUSCH,s} - \lfloor N_{symb}^{PUSCH,s} / 2 \rfloor$$

for the second hop, and the number of allocated symbols $$N_{symb}^{PUSCH,s}$$

allocated to msg3, can be indexed by index information of a Time Domain Resource Allocation (TDRA) table carried by a Random Access Response UpLink (RAR UL) grant. The index information can be used to index the values in the table, and the indexed value can indicate the number of symbols allocated for the msg3 transmission.

Optionally, the UE can also retrieve the number of available symbols allocated for msg3 based on the index information of the TDRA table carried by the RAR UL grant.

Due to the configuration of an initial UL BWP for the redcap UE that exceeds its system bandwidth, when frequency hopping is used for the transmission of msg3, the frequency domain position of the second hop may exceed its system bandwidth, resulting in the UE not being able to send msg3 to the network device via the second hop.

It should be noted that the OFDM symbol(s) on the time slot used for RF retuning are referred to as the target symbol(s). When the frequency hopping is enabled or activated for the msg3 transmission, the UE needs to perform the RF retuning if the frequency domain position of the second hop exceeds its system bandwidth. In the embodiments of the present disclosure, a portion of the symbols located between the two hops for the msg3 transmission is defined as the target symbol used for the UE to perform RF retuning. That is, at least one symbol located between a start symbol of the first hop and an end symbol of the second hop for msg3 may serve as the target symbol. There may be one or more target symbols, and the number of target symbols may be specified by the protocol or indicated by the network device, or the number of symbols for RF retuning may be decided by the UE and optionally may be reported to the network device.

In a possible implementation, a portion of the symbols at a designated position of the first hop and/or a designated position of the second hop for msg3 serves as the target symbol(s). In some embodiments, the designated position may be agreed upon by a protocol, and in other embodiments, the designated position may be indicated by the network device.

In a possible implementation, a portion of the symbols located between an end symbol of the first hop and a start symbol of the second hop for msg3 serves as the target symbol(s). That is, there exists a time gap or interval between the first hop and the second hop on which a plurality of symbols exists, and at least a portion of the plurality of symbols serves as the target symbol(s).

It should be noted that in order to ensure that the network device can correctly decode the information transmitted via the second hop, the timing of RF retuning needs to be earlier than the symbol(s) of the second hop that is or are used for transmitting a Demodulation Reference Signal (DMRS), i.e., the target symbol(s) need or needs to be located before the symbol(s) of the second hop for msg3 that is or are used for transmitting the DMRS.

In the embodiments of the present disclosure, in order to enable the UE to send msg3 to the network device via the second hop, before sending via the second hop, the UE needs to perform RF retuning, i.e., align the RF chain to the frequency band after the frequency hopping through the RF retuning process on the target symbol(s), so that the information corresponding to the second hop can be sent to the network device on that frequency band.

In the RF retuning method provided in the embodiments of the present disclosure, the UE can determine the target symbol for RF retuning and perform the RF retuning on the target symbol when the frequency hopping is enabled or activated during transmission. In the embodiments of the present disclosure, in a scenario where the UE's initial UL BWP is greater than its own default system bandwidth, when the frequency domain position of the second hop exceeds the system bandwidth, the RF chain can be aligned, by RF retuning on the target symbol, to the frequency band after the frequency hopping, so as to send msg3 to the network device via the second hop on that frequency band, and the loss of the information related to msg3 can be avoided.

FIG. 4 is a flow diagram of another radio frequency retuning method provided by an embodiment of the present disclosure. This RF retuning method is performed by a UE, which may be a redcap UE. As shown in FIG. 4, the RF retuning method includes the following steps.

S201, determining a portion of symbols at a designated position of the first hop and/or a designated position of the second hop for the msg3, as the target symbol.

In this embodiment of the present disclosure, the OFDM symbol(s) on the time slot for RF retuning is/are referred to as the target symbol(s). The target symbol(s) is/are located before the symbol(s) of the second hop for msg3 that is/are to be occupied by the DMRS.

Figure 5:
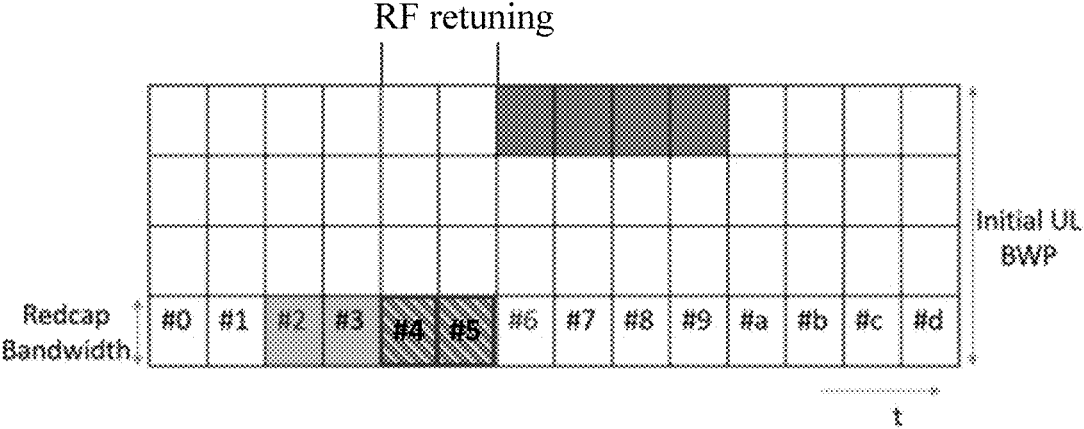
FIG. 5 is a schematic diagram of a target symbol provided by an embodiment of the present disclosure.

Optionally, as shown in FIG. 5, a portion of tail symbols of the first hop serves as the target symbol(s). For example, the last symbol of the first hop is reserved as the target symbol. For another example, the last several symbols of the first hop are reserved as the target symbols, e.g., the last two symbols of the first hop are reserved as target symbols.

Figure 6:
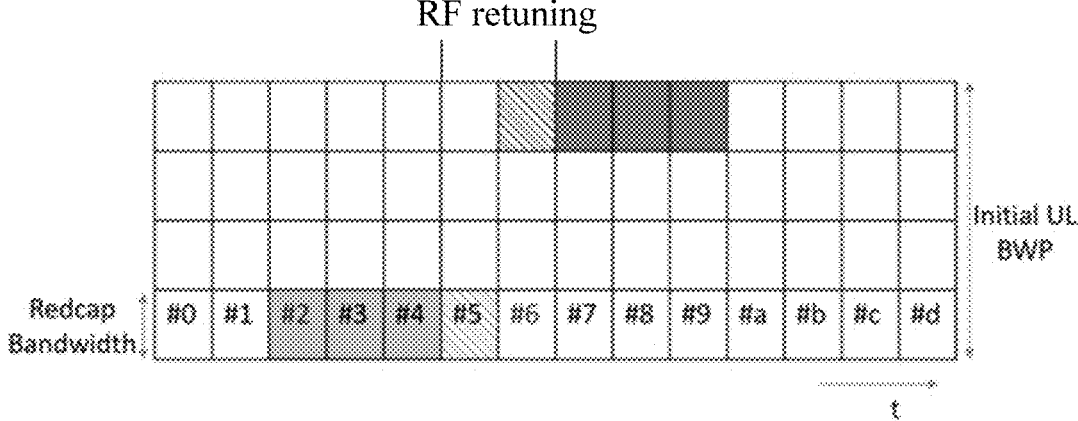
FIG. 6 is a schematic diagram of another target symbol provided by an embodiment of the present disclosure.

Optionally, as shown in FIG. 6, a portion of tail symbols of the first hop and a portion of head symbols of the second hop serve as the target symbols. For example, the last symbol of the first hop and the first symbol of the second hop are reserved as the target symbols. For another example, the last several symbols of the first hop and the first several symbols of the second hop are reserved as the target symbols, e.g., the last two symbols of the first hop and the first two symbols of the second hop are reserved as the target symbols.

Figure 7:
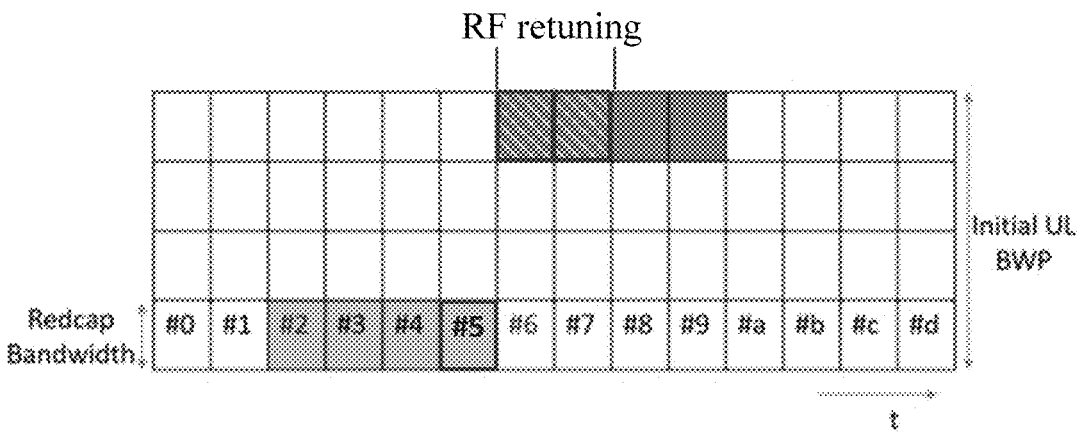
FIG. 7 is a schematic diagram of yet another target symbol provided by an embodiment of the present disclosure.

Optionally, as shown in FIG. 7, a portion of head symbols of the second hop serves as the target symbol(s). For example, the first symbol of the second hop is reserved as the target symbol. For another example, the first several symbols of the second hop are reserved as the target symbols, e.g., the first two symbols of the second hop are reserved as the target symbols.

Optionally, the UE may determine the number of first symbols for the first hop and/or the number of second symbols for the second hop based on the number of allocated symbols for the msg3 and a number of third symbols to be occupied by the RF retuning.

In the way by reallocating some of the original symbols into the target symbols, the number of symbols for the first hop and/or the second hop may be re-determined. In the embodiments of the present disclosure, the UE may determine the number of allocated symbols for msg3 and the number of third symbols to be occupied by RF retuning based on the network device or protocol agreement. In some embodiments, the UE receives a RAR UL grant message, and based on the index information of the TDRA table carried in the RAR UL grant message, it can retrieve the number of symbols corresponding to msg3 and/or the number of third symbols to be occupied by RF retuning. Here, the number of symbols corresponding to msg3 may be the number of allocated symbols for msg3 or the number of available symbols for msg3.

After obtaining the number of allocated symbols for msg3 and the number of third symbols to be occupied by RF retuning, the number of first symbols for the first hop and/or the number of second symbols for the second hop can be determined.

Optionally, a rounding operation is performed on a quotient of the number of allocated symbols and a designated value to obtain a first value, and a rounding operation is performed on a quotient of the number of third symbols and the designated value to obtain a second value. Here, the designated value may be 2. Optionally, the rounding operation may be an upward rounding operation or a downward rounding operation. Furthermore, the number of first symbols and/or the number of second symbols are determined based on the number of allocated symbols, the first value, and the second value.

In some embodiments, a downward rounding operation is performed on the quotient of the number of allocated symbols and the designated value (e.g., 2) to obtain the first value, and further, an upward rounding operation is performed on the quotient of the number of third symbols and the designated value (e.g., 2) to obtain the second value. In this case, the number of first symbols for the first hop is configured as a sum of the first value and the second value. The number of second symbols for the second hop is configured as a difference between the number of allocated symbols and the number of first symbols.

In other embodiments, a downward rounding operation is performed on the quotient of the number of allocated symbols and the designated value (e.g., 2) to obtain the first value, and further, a downward rounding operation is performed on the quotient of the number of third symbols and the designated value (e.g., 2) to obtain the second value. In this case, the number of first symbols for the first hop is configured as a difference between the first value and the second value. The number of second symbols for the second hop is configured as a difference between the number of allocated symbols and the number of first symbols.

In yet further embodiments, an upward rounding operation is performed on the quotient of the number of allocated symbols and the designated value (e.g., 2) to obtain the first value, and further, a downward rounding operation is performed on the quotient of the number of third symbols and the designated value (e.g., 2) to obtain the second value. In this case, the number of first symbols for the first hop is configured as a sum of the first value and the second value. The number of second symbols for the second hop is configured as a difference between the number of allocated symbols and the number of first symbols.

For the sake of subsequent explanation, $$N_{symb}^{PUSCH,s}$$

is used to indicate the number of allocated symbols, $F_1$ is used to indicate the number of first symbols for the first hop, $F_2$ is used to indicate the number of second symbols for the second hop, and $F_3$ is used to indicate the number of symbols to be occupied by RF retuning. For example, in a manner of using a portion of the tail symbols of the first hop as the target symbol(s), the number of first symbols for the first hop is configured as $$\lfloor N_{symb}^{PUSCH,s}/2 \rfloor + \lceil F_3/2 \rceil,$$

wherein the first value is $$\lfloor N_{symb}^{PUSCH,s}/2 \rfloor$$

and the second value is $\lfloor F_3/2 \rfloor$. The number of second symbols for the second hop is configured as $$N_{symb}^{PUSCH,s} - \lfloor N_{symb}^{PUSCH,s}/2 \rfloor - \lfloor F_3/2 \rfloor.$$

In a manner of using a portion of the head symbols of the second hop as the target symbol(s), the number of first symbols for the first hop is configured as $$\lfloor N_{symb}^{PUSCH,s}/2 \rfloor - \lfloor F_3/2 \rfloor,$$

wherein the first value is $$\lfloor N_{symb}^{PUSCH,s}/2 \rfloor$$

and the second value is $\lfloor F_3/2 \rfloor$. The number of second symbols for the second hop is configured as $$N_{symb}^{PUSCH,s} - \lfloor N_{symb}^{PUSCH,s}/2 \rfloor + \lfloor F_3/2 \rfloor.$$

It should be noted that the formula for configuring the number of symbols per hop is only exemplary, and other similar formulas employed should be included within the scope of the present disclosure and are not to be taken as a limitation of the present disclosure herein.

Optionally, the UE may also determine the start symbol of the first hop, a start symbol of the second hop and/or a start target symbol for RF retuning.

Optionally, the UE determines the start symbol of the first hop based on the index information in the TDRA table. That is, the UE receives the RAR UL grant message which carries the index information of the TDRA table, and this index information can be used to retrieve the start symbol indicating the first hop.

Further, the start symbol of the second hop and the start target symbol for RF retuning can be determined based on the start symbol of the first hop, the first value obtained by a rounding operation on the quotient of the number of allocated symbols and the designated value, and the second value obtained by a rounding operation on the quotient of the number of third symbols and the designated value.

In some embodiments, the start symbol of the first hop is determined as S through an index indication in the TDRA information. Further, the start symbol of the second hop is the sum of S and the number of first symbols. For example, in a manner of using a portion of the tail symbols of the first hop as the target symbol(s), the start symbol of the second hop may be $$S + \lfloor N_{symb}^{PUSCH,s}/2 \rfloor + \lceil F_3/2 \rceil.$$

Accordingly, the start target symbol for RF retuning may be $$S + \lfloor N_{symb}^{PUSCH,s}/2 \rfloor - \lfloor F_3/2 \rfloor.$$

In other embodiments, the start symbol of the first hop is determined as S through an index indication in the TDRA information. Further, the start symbol of the second hop is the sum of S and the number of first symbols. For example, in a manner of using a portion of the head symbols of the second hop as the target symbol(s), the start symbol of the second hop may be $$S + \lfloor N_{symb}^{PUSCH,s}/2 \rfloor - \lfloor F_3/2 \rfloor.$$

Accordingly, since the target symbol(s) to be occupied by the RF retuning belong a portion of head symbols of the second hop, the start target symbol for RF retuning may be $$S + \lfloor N_{symb}^{PUSCH,s}/2 \rfloor - \lfloor F_3/2 \rfloor.$$

It should be noted that the formulas for configuring the start symbol for each hop and the start target symbol for RF retuning are only exemplary, and other similar formulas employed should be included within the scope of the present disclosure and are not to be taken as a limitation of the present disclosure herein.

S202, performing the RF retuning on the target symbol.

Since the redcap UE is configured with an initial UL BWP that exceeds its system bandwidth, when frequency hopping is used for the transmission of msg3, the frequency domain position of the second hop may exceed its system bandwidth, resulting in the UE being unable to send msg3 via the second hop. In the embodiments of the present disclosure, in order to enable the UE to send the information corresponding to the second hop to the network device, before sending msg3 to the network device via the second hop, the UE needs to perform RF retuning, i.e., align the RF chain to the frequency band after the frequency hopping through the RF retuning process on the target symbol(s), so that msg3 can be sent to the network device via the second hop on that frequency band.

In some embodiments of the present disclosure, during a process of performing a determination of a Transport Block Size (TB S), the UE, in response to determining the TB S without using a Resource Element (RE) corresponding to the target symbol, does not map to-be-carried information to the target symbol. That is, the actual number of RE(s) may not include the corresponding RE on the target symbol when the UE performs the TBS calculation. Accordingly, no information may be carried on the target symbol when the UE performs the resource mapping. In this case, in order to reduce the bit rate and improve the success of information transmission, the network device may allocate more symbols or frequency resources to the UE.

In response to determining the TBS using the RE corresponding to the target symbol, the UE maps the to-be-carried information to the target symbol and does not send the information carried on the target symbol to the network device. That is, when the UE performs the TBS calculation, the actual number of RE(s) may further include the corresponding RE on the target symbol. Accordingly, the target symbol may actually carry information when the UE performs the resource mapping, but the UE does not send the information carried on the target symbol to the network device.

In the embodiments of the present disclosure, some of the original symbols are directly used as the target symbols without the need to allocate new symbol resources. Further, the number of symbols and start symbol of each hop can be re-determined to facilitate determining the timing and position of RF retuning, and the RF chain can be accurately aligned to the frequency band after the frequency hopping in order to send msg3 to the network device via the second hop on that frequency band, and the loss of information related to msg3 can be avoided.

Figure 8:
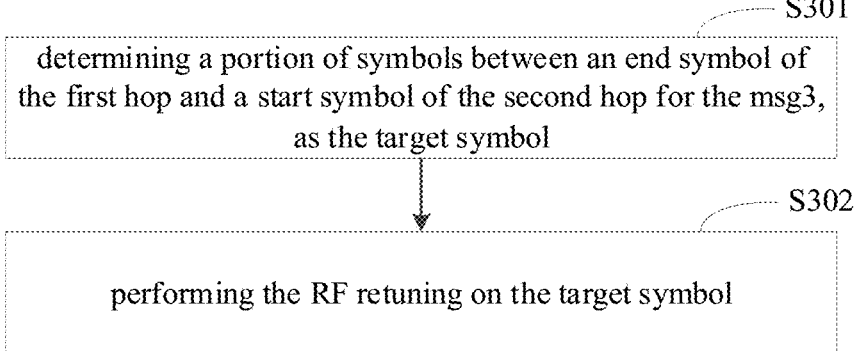
FIG. 8 is a flow diagram of yet another radio frequency retuning method provided by an embodiment of the present disclosure.

FIG. 8 is a flow diagram of yet another radio frequency retuning method provided by an embodiment of the present disclosure. This RF retuning method is performed by a UE, which may be a redcap UE. As shown in FIG. 8, the RF retuning method includes the following steps.

S301, determining a portion of symbols between an end symbol of the first hop and a start symbol of the second hop for the msg3, as the target symbol.

In this embodiment of the present disclosure, the OFDM symbol(s) on the time slot for RF retuning is/are referred to as the target symbol(s). The target symbol(s) is/are located before the symbol(s) of the second hop for msg3 that is/are to be occupied by the DMRS.

Figure 9:
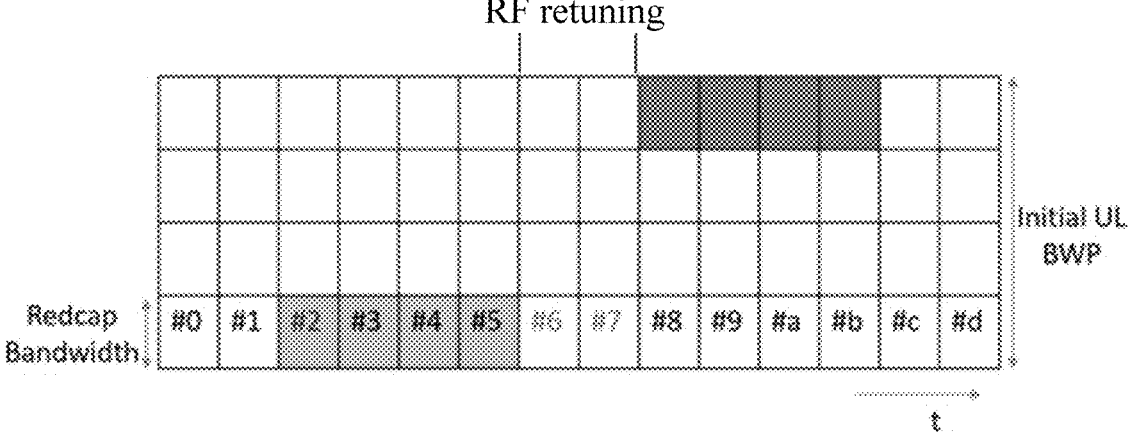
FIG. 9 is a schematic diagram of yet another target symbol provided by an embodiment of the present disclosure.

As shown in FIG. 9, a time gap or interval exists between the first hop and the second hop, and there are several symbols within the time interval. Optionally, at least a portion of the several symbols, located between the end symbol of the first hop and the start symbol of the second hop, serves as the target symbol(s).

In a possible implementation, the UE determines the number of first symbols for the first hop and the number of second symbols for the second hop based on the number of available symbols for msg3. The number of available symbols is a number of non-consecutive symbols, which may be indicated to the UE via the TRDA. In some embodiments, a rounding operation may be performed on the number of available symbols, and based on the result of the rounding operation, the number of first symbols for the first hop and/or the number of second symbols for the second hop are determined. For ease of illustration, the number of available symbols is denoted by symbol length. For example, the number of first symbols for the first hop is configured as ⌊symbollength⌋, and the number of second symbols for the second hop is configured as ⌊symbollength⌋.

Optionally, the UE determines the start symbol of the first hop based on the index information in the TDRA table. That is, the UE receives a RAR UL grant message, and based on the index information of the TDRA table carried in the RAR UL grant message, the UE can retrieve the start symbol indicating the first hop. Further, the UE can determine the start symbol of the second hop and the start target symbol for RF retuning based on the start symbol of the first hop, a value of a downward rounding operation on the number of available symbols (⌊symbollength⌋), and a number of third symbols. In some embodiments, the start symbol of the first hop is determined by the index indication in the TDRA table as S. Further, the start symbol of the second hop may be S+⌊symbollength⌋+$F_3$. Correspondingly, the start target symbol for RF retuning may be S+$F_1$.

In another possible implementation, the UE determines the number of first symbols for the first hop and/or the number of second symbols for the second hop based on the number of allocated symbols for msg3 and the number of third symbols to be occupied by the RF retuning. In some embodiments, a downward rounding operation is performed on a quotient of the number of allocated symbols and a designated value (e.g., 2) to obtain a third value, further, a downward rounding operation is performed on a quotient of the number of third symbols and the designated value (e.g., 2) to obtain a fourth value, and an upward rounding operation is performed on the quotient of the number of third symbols and the designated value (e.g., 2) to obtain a fifth value. The number of first symbols for the first hop is configured as the difference between the third value and the fourth value, i.e., $$\lfloor N_{symb}^{PUSCH,s}/2 \rfloor + \lfloor F_3/2 \rfloor,$$

wherein the third value is $$\lfloor N_{symb}^{PUSCH,s}/2 \rfloor,$$

and the fourth value is $\lfloor F_3/2 \rfloor$. The number of second symbols for the second hop is configured as the difference between the number of allocated symbols and the third and fifth values, i.e., $$N_{symb}^{PUSCH,s} - \lfloor N_{symb}^{PUSCH,s}/2 \rfloor - \lceil F_3/2 \rceil,$$

wherein the fifth value is $\lceil F_3/2 \rceil$.

Optionally, the UE determines the start symbol of the first hop based on the index information in the TDRA table, and further determines the start symbol of the second hop and the start target symbol for RF retuning based on the start symbol of the first hop, the number of allocated symbols, and the number of third symbols. In some embodiments, the UE determines, by the index indication in the TDRA information, the start symbol of the first hop as S. Further, the UE obtains a sum of S, the third value, and the fifth value, and determines the start symbol of the second hop based on the sum, i.e., the start symbol of the second hop is $$S + \lfloor N_{symb}^{PUSCH,s}/2 \rfloor + \lceil F_3/2 \rceil.$$

Correspondingly, the start target symbol for RF retuning may be $$S + \lfloor N_{symb}^{PUSCH,s}/2 \rfloor - \lfloor F_3/2 \rfloor.$$

It should be noted that the formulas for configuring the number of symbols per hop, the start symbol per hop, and the start target symbol for RF retuning are only exemplary, and other similar formulas employed should be included within the scope of the present disclosure and are not to be taken as a limitation of the present disclosure herein.

In yet another possible implementation, the UE may receive a field collection sent by the network device and determine the target symbol based on the field collection. The field collection includes at least one of the following information:

a position of at least one designated symbol of the first hop, wherein the position of the at least one designated symbol of the first hop may include the positions of the head and tail symbols of the first hop;

a position of at least one designated symbol of the second hop, wherein the position of the at least one designated symbol of the second hop may include the positions of the head and tail symbols of the second hop;

a position of at least one symbol of target symbols corresponding to the RF retuning, wherein the position of the at least one symbol of the target symbols may include the positions of a start target symbol and an end target symbol in the target symbols;

a number of first symbols for the first hop;

a number of second symbols for the second hop;

a number of third symbols to be occupied by the RF retuning; and a number of available symbols for the msg3.

Figure 10:
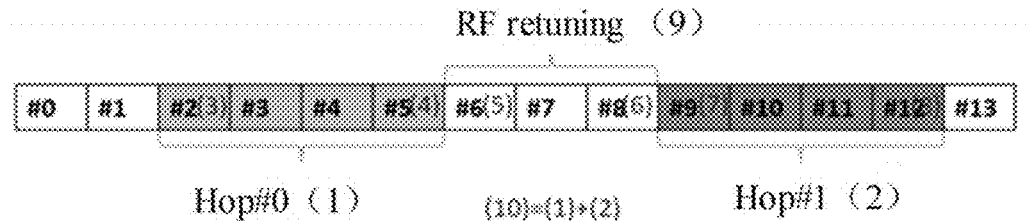
FIG. 10 is a schematic diagram of an indication of a target symbol provided by an embodiment of the present disclosure.

Optionally, the fields included in the field collection may be part of fields in the TRDA table. This part of fields is required to indicate resource allocation or to determine the position, which is used to determine the timing of RF retuning and the start symbol for each hop. Optionally, the field collection is a collection of the least number of fields including the required part of fields. FIG. 10 shows part of fields in the TRDA table, in which the first hop occupies symbol #2, symbol #3, symbol #4, and symbol #5, and the second hop occupies symbol #9, symbol #10, symbol #11, and symbol #12. As shown in FIG. 10, "(1)" indicates a number of first symbols for the first hop, "(2)" indicates a number of second symbols for the second hop, "(3)" indicates a position of a start symbol of the first hop, "(4)" indicates a position of a last symbol of the first hop, "(5)" indicates a position of a start target symbol corresponding to the RF retuning, "(6)" indicates a position of a last target symbol corresponding to the RF retuning, "(7)" indicates a position of a start symbol of the second hop, "(8)" indicates a position of a last symbol of the second hop, "(9)" indicates the number of target symbols to be occupied by RF retuning, and "(10)" indicates the sum of the number of available symbols for msg3, i.e., (10) is the sum of the number (1) of first symbols for the first hop and the number (2) of second symbols for the second hop.

The UE may receive from the network device the field collection including a number of fields in FIG. 10, e.g., the field collection may be formed using (3), (4) and (6). Further, for example, (3), (7) and (8) may be used to form the field collection. The UE, after obtaining the field collection, may determine the target symbol to be occupied by the RF retuning, and/or a start and end target symbol to be occupied by the RF retuning, based on the several fields included in the field collection. Optionally, the UE may also determine information related to the first hop and/or the second hop, such as a number of symbols for the first hop and/or a number of symbols for the second hop, a start and end symbol of the first hop and/or a start and end symbol of the second hop, based on the several fields included in the field collection.

For example, the field collection includes (3), (4) and (6), and the UE can determine that the position of the start symbol of the first hop is symbol #2 based on field (3). The UE can determine that the position of the last symbol of the first hop is symbol #5 based on field (4). The UE can determine that the position of the last target symbol corresponding to the RF retuning is symbol #8 based on field (6), and further determine that the start target symbol corresponding to the RF retuning is symbol #6 based on the number of symbols (i.e., 3) to be occupied by the RF retuning as indicated by the protocol agreement or the network, and subsequently, the UE can determine the target symbols to be occupied by the RF retuning, i.e., symbol #6, symbol #7, and symbol #8.

It should be noted that some or all of the above fields in FIG. 10 may be sent to the UE in table form while the network device uses indexes to provide the specific values, or some or all of the above fields may be indicated by the network device in some other way, and some of the above fields may be specified by the protocol.

S302, performing the RF retuning on the target symbol.

Since the redcap UE is configured with an initial UL BWP that exceeds its system bandwidth, when frequency hopping is used for the transmission of msg3, the frequency domain position of the second hop may exceed its system bandwidth, resulting in the UE being unable to send msg3 to the network device via the second hop. In the embodiments of the present disclosure, in order to enable the UE to send the information corresponding to the second hop to the network device, before sending msg3 to the network device via the second hop, the UE needs to perform RF retuning, i.e., align the RF chain to the frequency band after the frequency hopping through the RF retuning process on the target symbol(s).

In the embodiments of the present disclosure, using symbol resources spaced between two hops for RF retuning can ensure the integrity of the information transmitted at each hop. Further, the number of symbols and start symbol of each hop can be re-determined to facilitate determining the timing and position of RF retuning, and the RF chain can be accurately aligned to the frequency band after the frequency hopping in order to send msg3 to the network device via the second hop on that frequency band, and the loss of information related to msg3 can be avoided.

Figure 11:
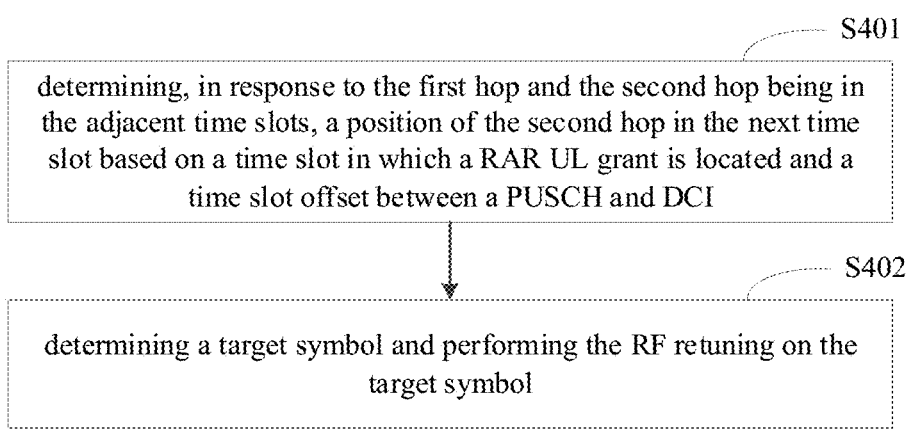
FIG. 11 is a flow diagram of yet another radio frequency retuning method provided by an embodiment of the present disclosure.

FIG. 11 is a flow diagram of yet another radio frequency retuning method provided by an embodiment of the present disclosure. This RF retuning method is performed by a UE, which may be a redcap UE. As shown in FIG. 11, the RF retuning method includes the following steps.

S401, determining, in response to the first hop and the second hop being in the adjacent time slots, a position of the second hop based on a time slot in which a RAR UL grant is located and a time slot offset between a PUSCH and DCI.

In the embodiments of the present disclosure, the UE sends msg3 to the network device via the first hop and the second hop in two adjacent time slots. Further, the UE determines the position of the second hop based on the time slot of the RAR UL grant and the time slot offset K2 between the PUSCH to the DCI. In some embodiments, the network device feeds a RAR UL grant to the UE via the slot #n carrying the DCI scheduling, and then the UE can receive the RAR UL grant and determine a time slot of the RAR UL grant. The time slot of the RAR UL grant actually corresponds to the slot #n carrying the DCI scheduling. Further, the UE sums the time slot of the RAR UL grant and the time slot offset K2, and determines the next position corresponding to the sum value as the position of the second hop, i.e., the position of the second hop is: the time slot of the RAR UL grant+K2+1.

S402, determining a target symbol and performing RF retuning on the target symbol.

In this embodiment of the present disclosure, the OFDM symbol(s) on the time slot for RF retuning is/are referred to as the target symbol(s). When frequency hopping is enabled for transmission of msg3, the UE determines that RF retuning is required if the frequency domain position of the second hop exceeds its system bandwidth. The UE may determine a portion of the symbols that are located between the two hops for the transmission of msg3, as target symbol(s) for RF retuning, i.e., the target symbol is at least one symbol located between a start symbol of the first hop and an end symbol of the second hop for msg3. There may be one or more target symbols, and the number of target symbols may be specified by the protocol or the network device indicates the number of symbols for RF retuning, or the number of symbols for RF retuning may be decided by the UE and optionally may be reported to the network device.

It should be noted that in order to ensure that the network device can receive the information transmitted via the second hop, the timing of RF retuning needs to be earlier than the symbol(s) of the second hop that is or are used for transmitting the DMRS, i.e., the target symbol(s) need or needs to be located before the symbol(s) of the second hop for msg3 that is or are used for transmitting the DMRS.

In a possible implementation, a portion of symbols at a designated position of the first hop and/or a designated position of the second hop for msg3, serves as the target symbol(s). In some embodiments, the designated position may be agreed upon by the protocol, and in other embodiments, the designated position may be indicated by a network device.

Optionally, as shown in FIG. 5, a portion of tail symbols of the first hop serves as the target symbol(s). Optionally, as shown in FIG. 6, a portion of tail symbols of the first hop and a portion of head symbols of the second hop serve as the target symbols. Optionally, as shown in FIG. 7, a portion of head symbols of the second hop serves as the target symbol(s). For example, a first symbol of the second hop is reserved as the target symbol.

In a possible implementation, as shown in FIG. 9, a portion of symbols located between an end symbol of the first hop and a start symbol of the second hop for msg3 serves as the target symbol(s).

Optionally, the UE may determine the start symbol of the first hop based on the index information of the TDRA table. Further, after determining the start symbol of the first hop, the UE may determine the start symbol of the second hop based on the start symbol of the first hop and the number of symbols corresponding to msg3. Here, the number of symbols corresponding to msg3 may be a number of available symbols or a number of allocated symbols for msg3. Optionally, a rounding operation may be performed on the number of symbols corresponding to msg3, and the start symbol of the second hop may be determined based on the result of the rounding operation and the start symbol of the first hop. The specific process may be referred to as described in the relevant contents of the above embodiments, and will not be repeated here. For example, when the number of symbols corresponding to msg3 is the number of allocated symbols for msg3, the start symbol of the first hop is determined as S based on the index information in the TDRA table, and the start symbol of the second hop is:

$$S + \lfloor N_{symb}^{PUSCH,s}/2 \rfloor.$$

Optionally, an index value of the start symbol of the second hop may be carried in the TDRA table, by which the start symbol of the second hop is determined, and further, the start symbol of the first hop is determined based on the start symbol of the second hop and the number of symbols corresponding to msg3. Here, the number of symbols corresponding to msg3 may be a number of available symbols or a number of allocated symbols for msg3. Optionally, a rounding operation may be performed on the number of symbols corresponding to msg3, and the start symbol of the first hop may be determined based on the result of the rounding operation and the start symbol of the second hop. The specific process may be referred to as described in the relevant contents of the above embodiments, and will not be repeated here. For example, when the number of symbols corresponding to msg3 is the number of allocated symbols for msg3, the start symbol of the second hop is determined as S based on the index information in the TDRA table, and the start symbol of the first hop is:

$$S - \lfloor N_{symb}^{PUSCH,s}/2 \rfloor.$$

Optionally, the index values of the start symbols of both the first and second hops are carried in the TDRA table, and the start symbol S of the first hop and the start symbol S' of the second hop are determined based on their respective index values.

Optionally, the UE may determine the number of first symbols for the first hop and/or the number of second symbols for the second hop based on the number of symbols corresponding to msg3 and/or the number of third symbols to be occupied by the RF retuning. Here, the number of symbols corresponding to msg3 may be a number of available symbols or a number of allocated symbols for msg3. In some embodiments, the UE may determine the number of first symbols for the first hop and/or the number of second symbols for the second hop based on the number of allocated symbols for msg3 and the number of third symbols to be occupied by RF retuning. The specific process may be referred to as described in the relevant contents of the above embodiments, and will not be repeated here. In other embodiments, the UE may determine the number of first symbols for the first hop and/or the number of second symbols for the second hop based on the number of available symbols for msg3. The specific process may be referred to as described in the relevant contents of the above embodiments, and will not be repeated here.

Since the redcap UE is configured with an initial UL BWP that exceeds its system bandwidth, when frequency hopping is used for the transmission of msg3, the frequency domain position of the second hop may exceed its system bandwidth, resulting in the UE being unable to send msg3 to the network device via the second hop. In the embodiments of the present disclosure, in order to enable the UE to send the information corresponding to the second hop to the network device, before sending msg3 corresponding to the second hop, the UE needs to perform RF retuning, i.e., align the RF chain to the frequency band after the frequency hopping via the RF retuning process on the target symbol(s).

In the embodiments of the present disclosure, the UE determines the target symbol for RF retuning in the case of frequency hopping enabled or activated for msg3 transmission, and the UE performs the RF retuning on the target symbol. In the embodiments of the present disclosure, in a scenario where the UE's initial UL BWP is greater than its own default system bandwidth, if the frequency domain position of the second hop exceeds its system bandwidth, by performing the RF retuning on the target symbol, the RF chain can be aligned to the frequency band after the frequency hopping, so that msg3 can be sent to the network device via the second hop on that frequency band, and the loss of the information related to msg3 can be avoided.

Figure 12:
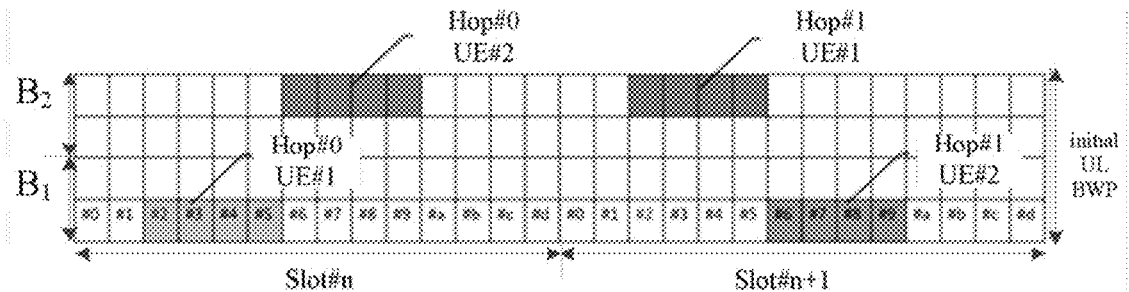
FIG. 12 is a schematic diagram of two UE multiplexing frequency bands provided by an embodiment of the present disclosure.

It should be noted that when the first hop and the second hop are located in the adjacent time slots, two UEs may perform bandwidth multiplexing within the initial UL BWP. As shown in FIG. 12, the initial UL BWP may include two frequency bands, i.e., first bandwidth $B_1$ and second bandwidth $B_2$, wherein bandwidth $B_1$ corresponds to the redcap UE, and bandwidth $B_2$ is the remaining bandwidth in addition to the bandwidth corresponding to the redcap UE. The first hop of UE #1 is within the bandwidth $B_1$ of Slot #n, and frequency hopping occurs in the second hop of UE #1 which is within the bandwidth $B_2$ of Slot #n+1. Since the initial UL BWP is wider, the first hop of UE #2 can be configured to be within the bandwidth $B_2$ of Slot #n, and frequency hopping occurs in the second hop of UE #2 which can be configured to be within the bandwidth $B_1$ of Slot #n+1.

FIG. 13 is a flow diagram of yet another radio frequency retuning method provided by an embodiment of the present disclosure. This RF retuning method is performed by a network device. As shown in FIG. 13, the RF retuning method includes the following steps.

S501, sending indication information to a UE, wherein the indication information is configured to instruct the UE to determine a target symbol for RF retuning, the target symbol being at least one symbol between a start symbol of a first hop and an end symbol of a second hop for msg3.

Optionally, the UE may be a redcap UE.

Since the redcap UE is configured with an initial UL BWP that exceeds its system bandwidth, when frequency hopping is used for the transmission of msg3, the frequency domain position of the second hop may exceed its system bandwidth, resulting in the UE being unable to send msg3 via the second hop. In the embodiments of the present disclosure, in order to enable the UE to send msg3 to the network device via the second hop, before sending the information corresponding to the second hop, the UE needs to perform RF retuning, i.e., align the RF chain to the frequency band after the frequency hopping via RF retuning, so that msg3 can be sent to the network device via the second hop on that frequency band.

It should be noted that the OFDM symbol(s) on the time slot for RF retuning is/are referred to as the target symbol(s). The UE needs to perform RF retuning if the frequency domain position of the second hop exceeds its system bandwidth when frequency hopping is enabled or activated for transmission of msg3. In the embodiments of the present disclosure, a portion of the symbols located between the two hops for the transmission of msg3 is defined as the target symbol used for the UE to perform RF retuning. There may be one or more target symbols, and the number of target symbols may be specified by the protocol or indicated by the network device, or the number of symbols for RF retuning may be decided by the UE and optionally may be reported to the network device.

It should be noted that in order to ensure that the network device can correctly decode the information transmitted via the second hop, the timing of the RF retuning needs to be earlier than the symbol(s) occupied by the DMRS in the second hop, i.e. the target symbol(s) need to be located before the symbol(s) of the second hop for the msg3 that is or are to be occupied by the DMRS.

Optionally, the indication information may be at least one of the following information: an index of the TDRA table, a number of target symbols, a position corresponding to a start target symbol, a number of first symbols for the first hop, a start symbol for the first hop, a number of second symbols for the second hop, a start symbol for the second hop, and a number of symbols corresponding to msg3. Optionally, the indication information may be transmitted via signaling such as DCI or Radio Resource Control (RRC). Optionally, the indication may be jointly indicated by DCI and RRC, e.g. by a table that specifies a joint field though the RRC/protocol, which is further indexed by the DCI indication.

In a possible implementation, a portion of the symbols at a designated position of the first hop and/or a designated position of the second hop for msg3, serves as the target symbol(s). In some embodiments, the designated position may be agreed upon by a protocol, and in other embodiments, the designated position may be indicated by the network device. Optionally, a portion of tail symbols of the first hop serves as the target symbol(s). Optionally, a portion of tail symbols of the first hop and a portion of head symbols of the second hop serve as the target symbols. Optionally, a portion of head symbols of the second hop serves as the target symbol(s). For example, a first symbol of the second hop is reserved as the target symbol.

In a possible implementation, a portion of the symbols located between the end symbol of the first hop and the start symbol of the second hop for msg3 serves as the target symbol(s). That is, there exists a time gap or interval between the first hop and the second hop on which several symbols exist, and at least a portion of the several symbols serves the target symbol(s).

Optionally, the first hop and the second hop for msg3 are in the same time slot, that is, the UE transmits msg3 to the network device through the first hop and the second hop in the same time slot, and accordingly, the network device may receive msg3 transmitted by the UE through the first hop and the second hop in the same time slot. Optionally, the first hop and the second hop for msg3 are located in the adjacent time slots, that is, the UE transmits part of the information of msg3 to the network device through the first hop in one of the adjacent time slots, and another part of the information of msg3 to the network device through the second hop in the next time slot. Accordingly, the network device may receive part of the information of msg3 transmitted by the UE through the first hop in one of the adjacent time slots, and another part of the information of msg3 transmitted by the UE through the second hop in the next time slot.

Optionally, the network device sends a RAR UL grant to the UE, which may serve as the indication information. The index information of the TDRA table is carried in the RAR UL grant.

Optionally, the network device sends a field collection to the UE, wherein the field collection may serve as the indication information for instructing the UE to determine the target symbol based on the field collection.

The field collection includes at least one of the following information:

a position of at least one designated symbol of the first hop;

a position of at least one designated symbol of the second hop;

a position of at least one symbol of target symbols corresponding to the RF retuning;

a number of first symbols for the first hop;

a number of second symbols for the second hop;

a number of third symbols to be occupied by the RF retuning; and a number of available symbols for the msg3.

A related description of the field collection can be found in the above embodiments and will not be repeated here.

In the RF retuning method provided in the embodiments of the present disclosure, in the case where frequency hopping is enabled or activated for the transmission of msg3, the network device may send indication information to the UE to instruct the UE to determine a target symbol for RF retuning and to perform the RF retuning on the target symbol. In the embodiments of the present disclosure, in the scenario that the UE's initial UL BWP is greater than its own default system bandwidth, when frequency band hopping occurs for the second hop, the RF chain can be aligned to the frequency band after the frequency hopping by RF retuning on the target symbol, in order to send msg3 to the network device via the second hop on the frequency band, and the loss of the information related to msg3 can be avoided.

FIG. 14 is a schematic diagram of a structure of a radio frequency retuning apparatus provided by an embodiment of the present disclosure. The RF retuning apparatus is applicable to a UE, which may be a redcap UE. As shown in FIG. 14, the RF retuning apparatus 100 includes a symbol determination module 11 and a RF retuning module 12.

The symbol determination module 11 is configured to determine a target symbol for RF retuning, wherein the target symbol is at least one symbol between a start symbol of a first hop and an end symbol of a second hop for a message 3 (msg3).

The RF retuning module 12 is configured to perform the RF retuning on the target symbol.

Optionally, the target symbol is before a symbol, for transmitting a demodulation reference signal (DMRS), of the second hop for the msg3.

Optionally, the symbol determination module 11 is further configured to determine a portion of symbols at a designated position of the first hop and/or a designated position of the second hop for the msg3, as the target symbol; wherein the designated position is agreed upon by a protocol or indicated by a network device.

Optionally, the symbol determination module 11 is further configured to determine, based on a number of allocated symbols for the msg3 and a number of third symbols to be occupied by the RF retuning, a number of first symbols for the first hop and/or a number of second symbols for the second hop.

Optionally, the symbol determination module 11 is further configured to:

obtain a first value by performing a rounding operation on a quotient of the number of allocated symbols and a designated value; and obtain a second value by performing a rounding operation on a quotient of the number of third symbols and the designated value; and determine, based on the number of allocated symbols, the first value, and the second value, the number of first symbols and/or the number of second symbols; and/or, determine, based on index information of a time domain resource allocation (TDRA) table, the start symbol of the first hop; and determine, based on the start symbol of the first hop, the first value and the second value, a start symbol of the second hop and a start target symbol for the RF retuning.

Optionally, the symbol determination module 11 is further configured to determine a portion of tail symbols of the first hop and/or a portion of head symbols of the second hop, as the target symbol.

Optionally, the symbol determination module 11 is further configured to disable, in response to determining a transmission block size (TBS) without using a resource element corresponding to the target symbol, mapping of to-be-carried information to the target symbol; or, perform, in response to determining a TBS using a resource element corresponding to the target symbol, mapping of to-be-carried information to the target symbol.

Optionally, the symbol determination module 11 is further configured to determine a portion of symbols between an end symbol of the first hop and a start symbol of the second hop for the msg3, as the target symbol.

Optionally, the symbol determination module 11 is further configured to determine, based on a number of available symbols for the msg3, a number of first symbols for the first hop and/or a number of second symbols for the second hop; and/or determine, based on index information of a TDRA table, the start symbol of the first hop; and determine, based on the start symbol of the first hop, a number of available symbols for the msg3, and a number of third symbols to be occupied by the RF retuning, a start symbol of the second hop.

Optionally, the symbol determination module 11 is further configured to determine, based on a number of allocated symbols for the msg3 and a number of third symbols to be occupied by the RF retuning, a number of first symbols for the first hop and/or a number of second symbols for the second hop; and/or, determine, based on index information of a TDRA table, the start symbol of the first hop; and determine, based on the start symbol of the first hop, a number of allocated symbols for the msg3, and a number of third symbols to be occupied by the RF retuning, a start symbol of the second hop and a start target symbol for the RF retuning.

Optionally, the symbol determination module 11 is further configured to receive a field collection sent by a network device and determine the target symbol based on the field collection;

wherein the field collection comprises at least one of:

a position of at least one designated symbol of the first hop;

a position of at least one designated symbol of the second hop;

a position of at least one symbol of target symbols corresponding to the RF retuning;

a number of first symbols for the first hop;

a number of second symbols for the second hop;

a number of third symbols to be occupied by the RF retuning; and a number of available symbols for the msg3.

Optionally, the first hop and the second hop for the msg3 are in a same time slot, or, the first hop and the second hop are in adjacent time slots.

Optionally, the symbol determination module 11 is further configured to determine, in response to the first hop and the second hop being in the adjacent time slots, a position of the second hop based on a time slot in which a RAR UL grant is located and a time slot offset between a PUSCH and DCI.

Optionally, the symbol determination module 11 is further configured to determine, based on index information of a TDRA table, the start symbol of the first hop; and determine, based on the start symbol of the first hop, and a number of symbols corresponding to the msg3, a start symbol of the second hop; or determine, based on index information of a TDRA table, a start symbol of the second hop; and determine, based on the start symbol of the second hop, and a number of symbols corresponding to the msg3, the start symbol of the first hop; or determine, based on index information of a TDRA table, the start symbol of the first hop and a start symbol of the second hop, respectively.

Optionally, the symbol determination module 11 is further configured to receive a RAR UL grant sent by the network device, wherein the RAR UL grant carries index information of a TDRA table.

In the RF retuning apparatus provided by the embodiments of the present disclosure, the UE determines the target symbol for RF retuning in the case of frequency hopping enabled or activated for msg3 transmission, and the UE performs the RF retuning on the target symbol. In the embodiments of the present disclosure, in a scenario where the UE's initial UL BWP is greater than its own default system bandwidth, if frequency band hopping occurs for the second hop, by performing the RF retuning on the target symbol, the RF chain can be aligned to the frequency band after the frequency hopping, so that msg3 can be sent to the network device via the second hop on that frequency band, and the loss of the information related to msg3 can be avoided.

FIG. 15 is a schematic diagram of a structure of a radio frequency retuning apparatus provided by an embodiment of the present disclosure. The RF retuning apparatus is applicable to a network device. As shown in FIG. 15, the RF retuning apparatus 200 includes a sending module 21.

The sending module 21 is configured to send indication information to a user equipment (UE), wherein the indication information is configured to instruct the UE to determine a target symbol for RF retuning. The UE may be a redcap UE.

Optionally, the target symbol is before a symbol of the second hop for the msg3 that is to be occupied by a demodulation reference signal (DMRS).

Optionally, the target symbol is a portion of symbols at a designated position of the first hop and/or a designated position of the second hop for the msg3.

Optionally, the target symbol includes a portion of tail symbols of the first hop and/or a portion of head symbols of the second hop.

Optionally, the target symbol includes a portion of symbols between the first hop and the second hop for the msg3.

Optionally, the first hop and the second hop for the msg3 are in a same time slot, or, the first hop and the second hop are in adjacent time slots.

Optionally, the sending module 21 is further configured to send a RAR UL grant to the UE, wherein the RAR UL grant serves as the indication information and carries index information of a TDRA table.

Optionally, the sending module 21 is further configured to send a field collection to the UE, wherein the field collection serves as the indication information and is configured to instruct the UE to determine the target symbol based on the field collection;

wherein the field collection includes at least one of:

a position of at least one designated symbol of the first hop;

a position of at least one designated symbol of the second hop;

a position of at least one symbol of the target symbols corresponding to the RF retuning;

a number of first symbols for the first hop;

a number of second symbols for the second hop;

a number of third symbols to be occupied by the RF retuning; and a number of available symbols for the msg3.

In the RF retuning apparatus provided in the embodiments of the present disclosure, in the case where frequency hopping is enabled or activated for the transmission of msg3, the network device may send indication information to the UE to instruct the UE to determine a target symbol for RF retuning and to perform the RF retuning on the target symbol. In the embodiments of the present disclosure, in the scenario that the UE's initial UL BWP is greater than its own default system bandwidth, when frequency band hopping occurs for the second hop, the RF chain can be aligned to the frequency band after the frequency hopping by RF retuning on the target symbol, in order to send msg3 to the network device via the second hop on the frequency band, and the loss of the information related to msg3 can be avoided.

According to the embodiments of the present disclosure, the present disclosure also provides a communication device and a readable storage medium.

As shown in FIG. 16, the communication device includes: one or more processors 1100, memory 1200, and interfaces for connecting the various components, including a high speed interface and a low speed interface. The components are connected to each other using different buses and may be mounted on a common motherboard or otherwise as desired. The processor may process instructions executed within the communication device, including instructions stored in or on memory to display graphical information of the GUI on an external input/output device (e.g., a display device coupled to the interface). In other embodiments, multiple processors and/or multiple buses may be used with multiple memories, if desired. Similarly, multiple communication devices may be connected, with individual devices providing some of the necessary operations (e.g., as a server array, a group of blade servers, or a multiprocessor system). A single processor 1100 is used as an example in FIG. 16.

Memory 1200 is the non-transitory computer-readable storage medium provided by the present disclosure. The memory stores instructions executable by at least one processor to cause the at least one processor to perform the RF retuning method provided in the present disclosure. The non-transitory computer-readable storage medium of the present disclosure stores computer instructions which are used to cause the computer to perform the RF retuning method provided herein.

Memory 1200, as a non-transitory computer-readable storage medium, may be used to store non-transitory software programs, non-transitory computer-executable programs, and modules, such as the program instructions/modules corresponding to the RF retuning method in the embodiments of the present disclosure. Processor 1100 executes various functional applications of the server and data processing by running the non-transitory software programs, instructions, and modules stored in memory 1200, i.e., realizing the RF retuning method in the above method embodiments.

Memory 1200 may include a storage program area and a storage data area, wherein the storage program area may store an operating system, an application program required for at least one function, and the storage data area may store data created based on the use of the location communication device, among other things. In addition, memory 1200 may include a high-speed random access memory, and may also include a non-transitory memory, such as at least one disk memory device, a flash memory device, or other non-transitory solid state memory device. Optionally, memory 1200 may optionally include memories set remotely with respect to processor 1100, and these remote memories may be connected to the location communication device via a network. Examples of the networks include, but are not limited to, Internet, intranets, local area networks, mobile communication networks, and combinations thereof.

The communication device may further include an input device 1300 and an output device 1400. Processor 1100, memory 1200, input device 1300 and output device 1400 may be connected via a bus or other means, and the connection via a bus is shown as an example in FIG. 16.

Input device 1300 may receive incoming numeric or character information, and generate inputs of key signals related to user settings as well as function control of the positioning communication device, such as a touch screen, keypad, mouse, track pad, touch pad, indicator bar, one or more mouse buttons, trackball, joystick, and other input devices. Output device 1400 may include a display device, an auxiliary lighting device (e.g., an LED), and a haptic feedback device (e.g., a vibration motor), among others. The display device may include, but is not limited to, a liquid crystal display (LCD), a light emitting diode (LED) display, and a plasma display. In some embodiments, the display device may be a touch screen.

Various embodiments of the systems and techniques described herein may be implemented in digital electronic circuit systems, integrated circuit systems, Application Specific Integrated Circuits (ASICs), computer hardware, firmware, software, and/or combinations thereof. These various embodiments may include: implementation in one or more computer programs that may be executed and/or interpreted on a programmable system including at least one programmable processor. The programmable processor may be a special-purpose or general-purpose programmable processor, which receives data and instructions from a storage system, at least one input device, and at least one output device, and that transmits data and instructions to the storage system, at least one input device, and at least one output device.

These computational programs (also referred to as programs, software, software applications, or code) include machine instructions for the programmable processor and may be implemented using high-level procedural and/or object-oriented programming languages, and/or assembly/machine languages. As used herein, the terms "machine readable medium" and "computer readable medium" refer to any computer program product, device, and/or apparatus (e.g., magnetic disk, optical disk, memory, programmable logic device (PLD)) used to provide machine instructions and/or data to a programmable processor, including a machine readable medium that receives machine instructions as machine readable signals. The term "machine readable signal" refers to any signal used to provide machine instructions and/or data to a programmable processor.

To provide interaction with a user, the systems and techniques described herein may be implemented on a computer having a display device (e.g., a cathode ray tube (CRT) or liquid crystal display (LCD) monitor) for displaying information to the user, and a keyboard and a pointing device (e.g., a mouse or a trackball) by which the user may provide input to the computer. Other types of devices may also be used to provide interaction with the user, for example, the feedback provided to the user may be any form of sensory feedback (e.g., visual, auditory, or haptic feedback), and the input from the user may be received in any form, including acoustic, voice, or haptic input.

The systems and techniques described herein may be implemented in a computing system that includes a back-end component (e.g., as a data server), or a computing system that includes a middleware component (e.g., an application server), or a computing system that includes a front-end component (e.g., a user's computer that has a graphical user interface or web browser through which a user can interact with any of the embodiments of the systems and techniques described herein), or a computing system that includes any combination of such back-end components, middleware components, or front-end components. The components of the system may be interconnected by digital data communications (e.g., a communications network) in any form or medium. Examples of communication networks include: local area networks (LANs), wide area networks (WANs), and the Internet.

A computer system may include a client and a server. The client and server are generally remote from each other and usually interact over a communication network. The client-server relationship is created by computer programs that run on corresponding computers and have a client-server relationship with each other.

A person of ordinary skill in the art may appreciate that all or some of the steps carried out to realize the method of the above embodiments can be accomplished by instructing the associated hardware through a program, and the program can be stored in a computer-readable storage medium which, when executed, can implement one of the steps of the method embodiments or a combination thereof.

Furthermore, the various functional units in the various embodiments of the present disclosure may be integrated in a single processing module, or the individual units may physically exist separately, or two or more units may be integrated in a single module. The integrated modules may be implemented either in the form of hardware or in the form of software functional modules. The integrated modules may also be stored in a computer-readable storage medium if they are implemented in the form of a software functional module and sold or used as a separate product.

The storage medium referred to above may be read-only memories, magnetic discs or optical discs, etc.

The description above is only a preferred embodiment of the present disclosure, and it should be noted that for a person of ordinary skill in the art, a number of improvements and embellishments may be made without departing from the principles of the present disclosure, and these improvements and embellishments should also be regarded as being within the scope of protection of the present disclosure.

What is claimed is:

1. A method for radio frequency (RF) retuning, applied to a user equipment (UE), the method comprising:

determining at least one target symbol for RF retuning, wherein the at least one target symbol is between a start symbol of a first hop and an end symbol of a second hop for a message 3 (msg3);

performing the RF retuning on the at least one target symbol; and determining, in response to the first hop and the second hop being in adjacent time slots, a position of the second hop based on a time slot in which a random access response uplink grant is located and a time slot offset between a physical uplink shared channel (PUSCH) and downlink control information (DCI).

2. The method of claim 1, wherein the at least one target symbol is before a symbol, for transmitting a demodulation reference signal (DMRS), of the second hop for the msg3.

3. The method of claim 1, wherein determining the at least one target symbol for RF retuning comprises:

determining at least one symbol at a first designated position of the first hop and/or a second designated position of the second hop for the msg3 as the at least one target symbol; wherein the first designated position and/or the second designated position is agreed upon by a protocol or indicated by a network device.

4. The method of claim 3, further comprising:

determining, based on a number of allocated symbols for the msg3 and a number of third symbols to be occupied by the RF retuning, a number of first symbols for the first hop and/or a number of second symbols for the second hop.

5. The method of claim 4, further comprising:

obtaining a first value by performing a rounding operation on a quotient of the number of allocated symbols and a designated value; and obtaining a second value by performing a rounding operation on a quotient of the number of third symbols and the designated value; and determining, based on the number of allocated symbols, the first value, and the second value, the number of first symbols and/or the number of second symbols; and/or, determining, based on index information of a time domain resource allocation (TDRA) table, the start symbol of the first hop; and determining, based on the start symbol of the first hop, the first value and the second value, a start symbol of the second hop and a start target symbol for the RF retuning.

6. The method of claim 4, further comprising:

receiving a random access response uplink grant sent by a network device, wherein the random access response uplink grant carries index information of a TDRA table.

7. The method of claim 3, further comprising:

determining at least one tail symbol of the first hop and/or at least one head symbol of the second hop as the at least one target symbol.

8. The method of claim 7, further comprising:

disabling, in response to determining a transmission block size (TBS) without using a resource element corresponding to the at least one target symbol, mapping of to-be-carried information to the at least one target symbol; or, performing, in response to determining a TBS using a resource element corresponding to the at least one target symbol, mapping of to-be-carried information to the at least one target symbol.

9. The method of claim 1, wherein determining the at least one target symbol for RF retuning comprises:

determining at least one symbol between an end symbol of the first hop and a start symbol of the second hop for the msg3 as the at least one target symbol.

10. The method of claim 9, further comprising:

determining, based on a number of available symbols for the msg3, a number of first symbols for the first hop and/or a number of second symbols for the second hop; and/or determining, based on index information of a TDRA table, the start symbol of the first hop; and determining, based on the start symbol of the first hop, a number of available symbols for the msg3, and a number of third symbols to be occupied by the RF retuning, a start symbol of the second hop.

11. The method of claim 9, further comprising:

determining, based on a number of allocated symbols for the msg3 and a number of third symbols to be occupied by the RF retuning, a number of first symbols for the first hop and/or a number of second symbols for the second hop; and/or, determining, based on index information of a TDRA table, the start symbol of the first hop;

and determining, based on the start symbol of the first hop, a number of allocated symbols for the msg3, and a number of third symbols to be occupied by the RF retuning, a start symbol of the second hop and a start target symbol for the RF retuning.

12. The method of claim 9, further comprising:

receiving a field collection sent by a network device and determining the at least one target symbol based on the field collection;

wherein the field collection comprises at least one of:

a position of at least one designated symbol of the first hop;

a position of at least one designated symbol of the second hop;

a position of the at least one target symbol corresponding to the RF retuning;

a number of first symbols for the first hop;

a number of second symbols for the second hop;

a number of third symbols to be occupied by the RF retuning; and a number of available symbols for the msg3.

13. The method of claim 1, further comprising:
determining, based on index information of a TDRA
    table, the start symbol of the first hop;
and determining, based on the start symbol of the first
    hop, and a number of symbols corresponding to the
    msg3, a start symbol of the second hop; or
determining, based on index information of a TDRA
    table, a start symbol of the second hop;
and determining, based on the start symbol of the second
    hop, and a number of symbols corresponding to the
    msg3, the start symbol of the first hop; or
determining, based on index information of a TDRA
    table, the start symbol of the first hop and a start symbol
    of the second hop, respectively.

14. A non-transitory computer storage medium, wherein
the computer storage medium stores computer-executable
instructions that, when executed by a processor, enable the
processor to implement the method in claim 1.

15. A method for radio frequency (RF) retuning, applied
to a network device, the method comprising:
    sending indication information to a user equipment (UE),
        wherein the indication information is configured to
        instruct the UE to determine at least one target symbol
        for RF retuning, the at least one target symbol is
        between a start symbol of a first hop and an end symbol
        of a second hop for a message 3 (msg3), and the
        indication information is further configured to instruct
        the UE to determine, in response to the first hop and the
        second hop being in adjacent time slots, a position of
        the second hop based on a time slot in which a random
        access response uplink grant is located and a time slot
        offset between a physical uplink shared channel
        (PUSCH) and downlink control information (DCI).

16. The method of claim 15, further comprising:
sending a random access response uplink grant to the UE,
    wherein the random access response uplink grant
    serves as the indication information and carries index
    information of a time domain resource allocation
    (TDRA) table.

17. The method of claim 15, further comprising:
sending a field collection to the UE, wherein the field
    collection serves as the indication information and is
    configured to instruct the UE to determine the at least
    one target symbol based on the field collection;
wherein the field collection comprises at least one of:
a position of at least one designated symbol of the first
    hop;
a position of at least one designated symbol of the second
    hop;
a position of the at least one target symbol corresponding
    to the RF retuning;
a number of first symbols for the first hop;
a number of second symbols for the second hop;
a number of third symbols to be occupied by the RF
    retuning; and
a number of available symbols for the msg3.

18. A communication device, comprising:
at least one processor, and
a memory in a communication connection with the at least
    one processor; wherein
the memory stores instructions executable by the at least
    one processor, the instructions being executable by the
    at least one processor to enable the at least one pro-
    cessor to:
determine at least one target symbol for radio frequency
    (RF) retuning, wherein the at least one target symbol is
    between a start symbol of a first hop and an end symbol
    of a second hop for a message 3 (msg3);
perform the RF retuning on the at least one target symbol;
    and
determine, in response to the first hop and the second hop
    being in adjacent time slots, a position of the second
    hop based on a time slot in which a random access
    response uplink grant is located and a time slot offset
    between a physical uplink shared channel (PUSCH)
    and downlink control information (DCI).

* * * * *